United States Patent [19]

Fisher

[11] Patent Number: 4,588,199
[45] Date of Patent: May 13, 1986

[54] SWIVEL CONNECTION FOR TRAILERS

[76] Inventor: William E. Fisher, 3318 S. 114 E. Ave., Tulsa, Okla. 74145

[21] Appl. No.: 583,441

[22] Filed: Feb. 24, 1984

[51] Int. Cl.⁴ .............................................. B60D 1/00
[52] U.S. Cl. .................................... 280/204; 280/492; 280/494
[58] Field of Search .................... 280/204, 460 R, 468, 280/489, 492, 493, 494, 495, 504, 502, 400

[56] References Cited

U.S. PATENT DOCUMENTS

| 2,342,407 | 2/1944 | LeTourneau | 280/492 |
| 3,552,775 | 1/1971 | Warner | 280/492 |
| 3,905,619 | 9/1975 | Sylvester | 280/494 X |
| 4,200,306 | 4/1980 | Helms | 280/494 |

FOREIGN PATENT DOCUMENTS 1303180  7/1962  France ............................. 280/494

Primary Examiner—John J. Love
Assistant Examiner—Mitchell J. Hill
Attorney, Agent, or Firm—Head, Johnson & Stevenson

[57] ABSTRACT

A swivel connection adapted to be interposed between a motorcycle, or other small vehicle, and a trailer being towed thereby in order to isolate any variation of the vertical orientation of the motorcycle from the trailer. The swivel connection comprises a channel member secured to the usual hitch assembly normally provided for the motorcycle, and a box member secured to the channel member for receiving a spindle member therein. The spindle member is rigidly secured to the box member and extends axially outwardly therefor for rotational connection with a sleeve member secured to the usual tongue provided on the trailer. The rotation connection between the spindle member and sleeve member permits the vertical variations of the motorcycle to be absorbed, thus isolating the trailer therefrom.

2 Claims, 6 Drawing Figures

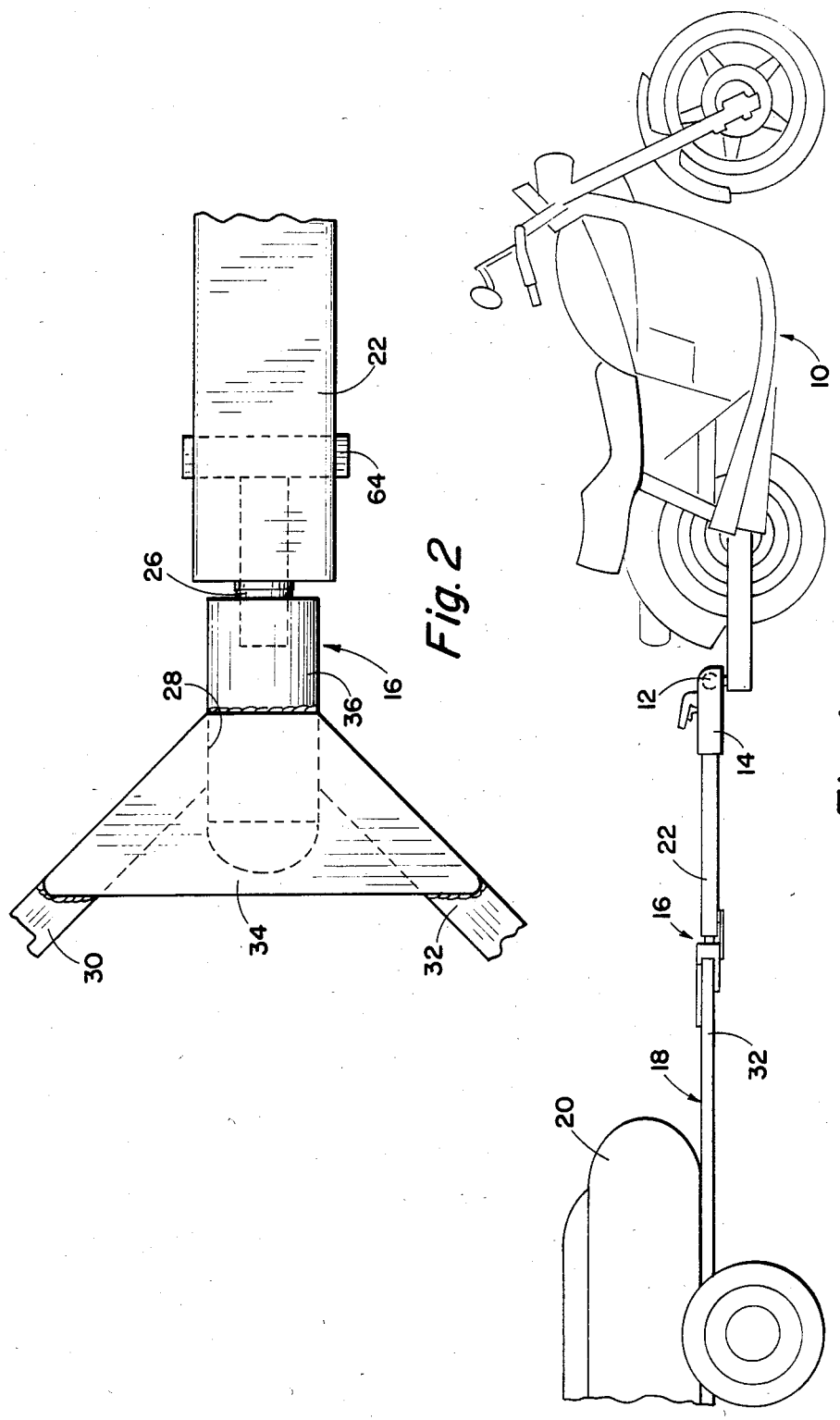

SWIVEL CONNECTION FOR TRAILERS

BACKGROUND OF THE INVENTION

1. Field of the Invention

This invention relates to improvements in hitch connections for trailers and more particularly, but not by way of limitation, to a swivel connection for trailers.

2. Description of the Prior Art

The use of motorcycles and other small vehicles for transportation has become increasingly popular in recent times, both for economy in light of the higher costs of fuel, and for pleasure. As the use of these vehicles has increased, there has been the development of relatively small trailers adapted to be towed behind a motorcycle, or other small vehicles. Problems occur when these trailers are being towed behind a motorcycle in that as the cycle tilts from a substantially vertical or upright position during travel along the highway, the trailer tilts simultaneously therewith. This is a great disadvantage, particularly in the event the cycle actually turns completely away from a vertical orientation to a horizontal orientation since the trailer is turned over simultaneously therewith, frequently causing damage to the trailer and its contents. There have been attempts to overcome this problem as shown in the Utterback U.S. Pat. No. 2,221,278, issued Nov. 12, 1940, and entitled "Trailer Hitch;" Flynn et al U.S. Pat. No. 2,272,619, issued Feb. 10, 1942, and entitled "Tractor and Rudder Hitch;" Tourneau U.S. Pat. No. 2,342,407, issued Feb. 22, 1944, and entitled "Universal Tractor Hitch;" Carlson U.S. Pat. No. 2,404,362, issued July 23, 1946, and entitled "Trailer Hitch;" Chaffin U.S. Pat. No. 2,435,383, issued Feb. 3, 1948, and entitled "Trailer Hitch;38 Jones U.S. Pat. No. 2,448,436, issued Aug. 31, 1948, and entitled "Trailer Hitch;" Hurd U.S. Pat. No. 2,464,315, issued Mar. 15, 1949, and entitled "Swivel Draft Bar for Tractors and the Like;" Hollis U.S. Pat. No. 2,871,030, issued Jan. 27, 1959, and entitled "Equipment Hitch for Vehicles;" Arbaugh U.S. Pat. No. 3,175,846, issued Mar. 30, 1965, and entitled "Trailer Hitch;" Hallam U.S. Pat. No. 3,716,105, issued Feb. 13, 1973, and entitled "Grading Attachment for a Vehicle;" Flegel U.S. Pat. No. 3,843,164, issued Oct. 22, 1974, and entitled "Bicycle Cart Connector;" and the Mitchell U.S. Pat. No. 4,254,966, issued Mar. 10, 1981, and entitled "Arrangement for Coupling Vehicles."

The Hollis patent shows a swivel connector at the hitch member and includes a bar connected with the support bracket adapted to be secured to the towing vehicle, and a sleeve connected with the trailer portion. The bar is freely rotatable with respect to the sleeve, thus isolating vertical displacement of the towing vehicle from the trailing vehicle. The LeTourneau hitch provides for universal connection between the towing vehicle and the towed vehicle, and the Utterback trailer hitch also provides for isolation between the towing vehicle and trailer in both a horizontal plane and a vertical plane. These references, however, are related to a particular hitch construction and are not designed for use in combination with a motorcycle, or the like, and are not efficiently applicable to such an environment. The Flegal patent is directed to a cart adapted to be towed by a bicycle, the cart being constructed in such a manner that it may be "knocked down" and readily reassembled. The tow bar permits rotation about three axes relative to the bicycle, but the apparatus is not of a practical construction to be applied to a trailer towing motorcycle. The remaining references are directed toward hitch constructions which are not designed nor applicable for the towing of a trailer behind a motorcycle, and as a result are not practical for use in combination with a motorcycle or other small vehicle.

SUMMARY OF THE INVENTION

The present invention contemplates a novel swivel connection adapted to be interposed between the usual ball hitch assembly and the tongue member of a trailer. The novel swivel connection apparatus comprises a channel member secured to the hitch assembly and extending axially outwardly therefrom in a direction toward the trailer. A box means is welded or otherwise rigidly secured within the channel member in the proximity of the outer end thereof for supporting a spindle or rod member. The spindle member is welded or otherwise rigidly secured to the box means and extends axially outwardly therefrom for rotatable engagement with a sleeve means which is welded or otherwise rigidly secured to the outer end of the trailer tongue member. The spindle means is rotatable about its own axis and extend through the sleeve for receiving a suitable lock nut means on the outer end thereof for retaining the spindle in position within the sleeve. A suitable cap means may be secured over the exposed lock nut means for protection thereof from contamination due to road dirt and the like during use of the swivel connection device. An alignment means is welded or otherwise secured to the outer periphery of the sleeve and extend axially outwardly therefrom in a direction toward the channel means for a free engagement with the open end thereof. As long as the orientation of the motorcycle remains substantially vertical, the alignment means provides for a suitable alignment between the trailer and the motorcycle. When the plane of the motorcycle veers sufficiently from the vertical, the side of the open end of the channel means bears against the outer portion of the alignment means for deflection thereof whereby the motorcycle is free to move in a vertical plane completely independently of the trailer. Thus, the trailer remains upright, even in the event the motorcycle should fall completely on its side. The trailer is thus protected from accidental damage to its own construction and the contents thereof remain intact. The novel swivel connection apparatus is simple and efficient in construction and economical and durable in construction.

BRIEF DESCRIPTION OF THE DRAWINGS

FIG. 1 is a side elevational view of a motorcycle towing a trailer by means of a swivel connection assembly embodying the invention.

FIG. 2 is a plan view of a swivel connection embodying the invention.

DETAILED DESCRIPTION OF THE PREFERRED EMBODIMENT

Figure 3:
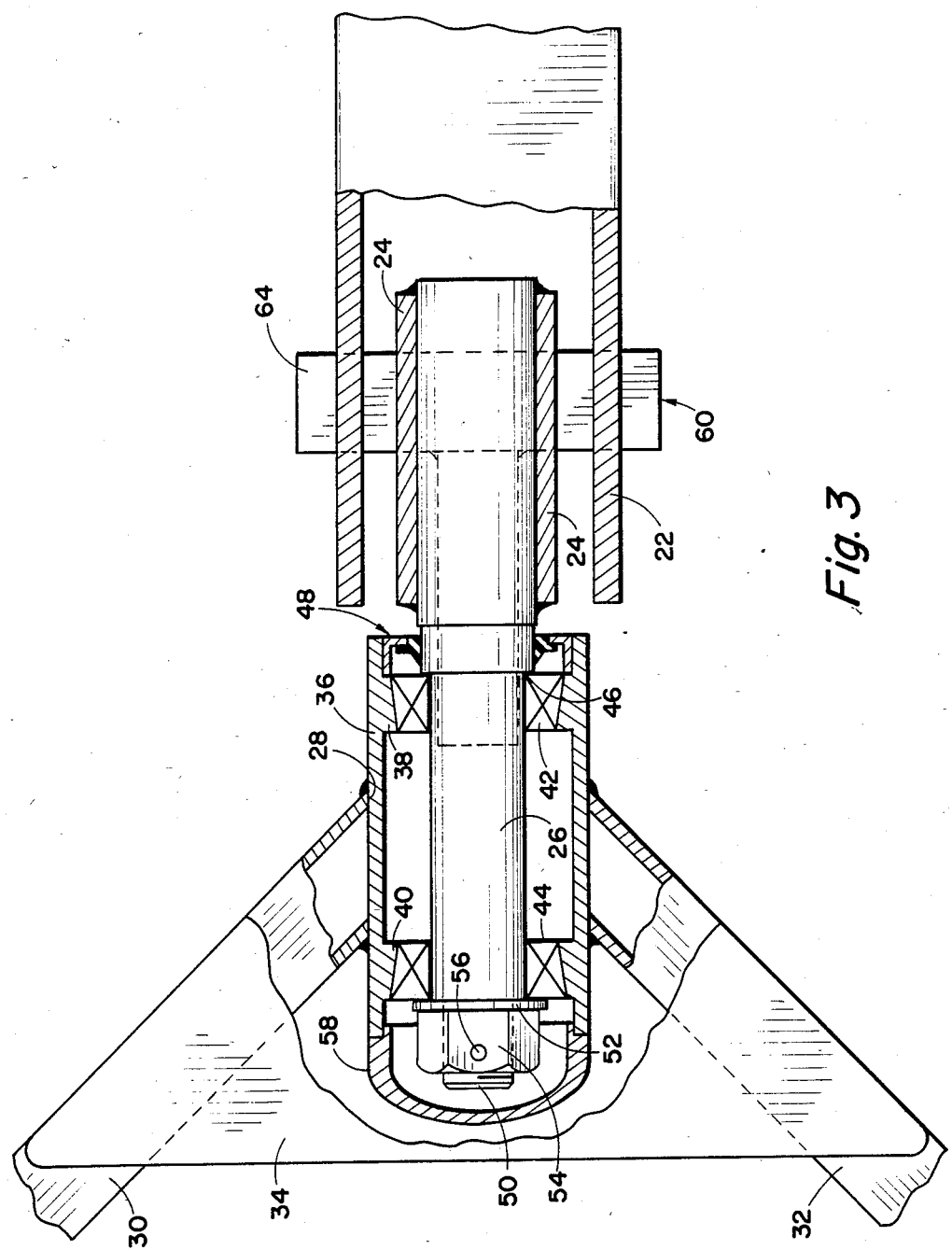
FIG. 3 is an enlarged plan view, partly in section, with portion thereof eliminated for purposes of illustration.

Referring to the drawings in detail, reference character 10 generally indicates a motorcycle having the usual ball element 12 mounted therein in any well known or suitable manner for removable engagement with the mating connector member 14 of the usual trailer hitch assembly. A swivel connection device, generally indicated at 16 is interposed between the connector member 14 and the usual tongue means 18 of a trailer 20 being towed behind the motorcycle 10. The trailer 20 is preferably of a two wheeled type, but not limited thereto, whereby the normal running or operating position of the trailer 20 is upright or in a vertical orientation. The trailer 20 is normally self-supporting in an upright or vertical position. The swivel connection device 16 isolates any variation in the vertical orientation of the motorcycle 10 from the trailer 20 whereby the trailer 20 remains in the normal upright position thereof as the motorcycle 10 and trailer 20 move over a highway, or the like.

The swivel connection device comprises an elongated bar means 22 welded or otherwise secured to the connector member 14 of the trailer hitch assembly. The bar 22 is preferably of a substantially U-shaped cross sectional configuration, but not limited thereto, and extends axially outwardly from the connector means 14 in a direction away from the motorcycle 10. An open ended box member 24 is welded or otherwise rigidly secured within the channel or bar 22 in the proximity of the outer end thereof, and a rod or spindle member 26 is welded or otherwise rigidly secured within the box 24 and extends axially outwardly therefrom in a direction away from the hitch member 14.

The tongue member 18 is provided with a hiatus 28 between the forwardly disposed diverging side arms 30 and 32 thereof, as particularly shown in FIGS. 2 and 3, and a gusset or strengthening place means 34 is welded or suitably rigidly secured to the upper surface of the arm members 30 and 32, and is preferably of a substantially triangular configuration spanning the distance between the arms and covering the upper side of the hiatus 28. An opened ended sleeve or cylindrical housing 36 is rigidly secured in the hiatus 28 in any suitable manner, such as by welding, or the like, and is disposed in substantial axial alignment with the rod or spindle member 26 for slidably receiving the spindle 26 therein. A pair of longitudinally spaced inwardly directed shoulders 38 and 40 (FIG. 3) are provided on the inner periphery of the sleeve 36 and may be integral therewith or secured thereto in any suitable manner. Suitable bearing members 42 and 44 are disposed around the outer periphery of the rod or spindle 26 and are supported by the shoulders 38 and 40, respectively for journalling the spindle within the sleeve 36 for free rotation about the longitudinal axis thereof. An outwardly directed circumferential shoulder 46 may be provided on outer periphery of the spindle 26 for engagement with the outer extremity of the bearing means 42 for limiting the movement of the spindle 26 in one direction.

A suitable sealing assembly 48 may be disposed outboard of the bearing means 46 and interposed between the inner periphery of the sleeve 36 and outer periphery of the spindle 26 for precluding contamination of the bearing means from road dirt, or the like. In addition, it is preferable to provide a reduced diameter threaded portion 50 at the outer end of the spindle 26 for receiving a lock washer 52 and nut 54 thereon. The lock washer preferably bears against the outer face of the bearing 44 and the nut 54 may be secured in position against the outer face of the washer 52 in any suitable manner, such as by a set screw 56, or the like, as is well known. In this manner, the spindle 26 is secured against longitudinal movement with respect to the sleeve 36, but is free to rotate about its own longitudinal axis during use of the device 16 as will be hereinafter set forth. A cover means 58 may be removably secured to the inwardly directed end of the sleeve 36 for protection of the nut 54 and bearing 44 from contamination by road dirt, or the like.

Figure 4:
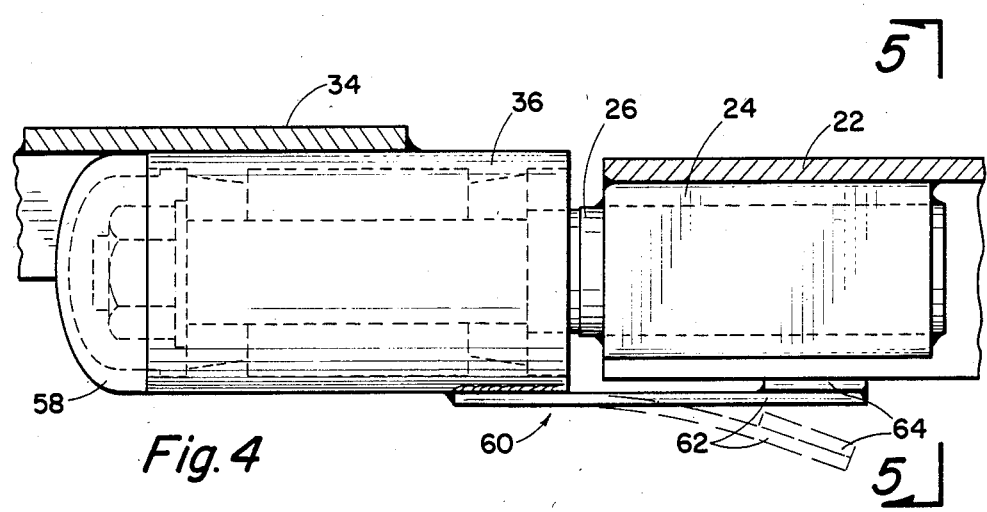
FIG. 4 is a side elevational view, partly in section, of a swivel connection embodying the invention.
Figure 5:
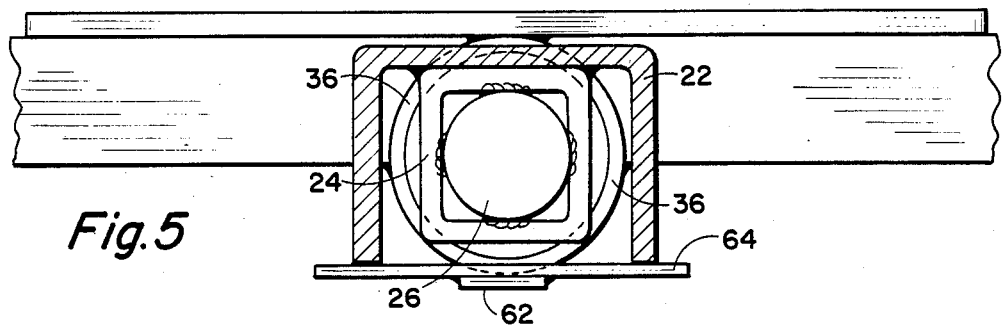
FIG. 5 is a view taken on line 5—5 of FIG. 4.
Figure 6:
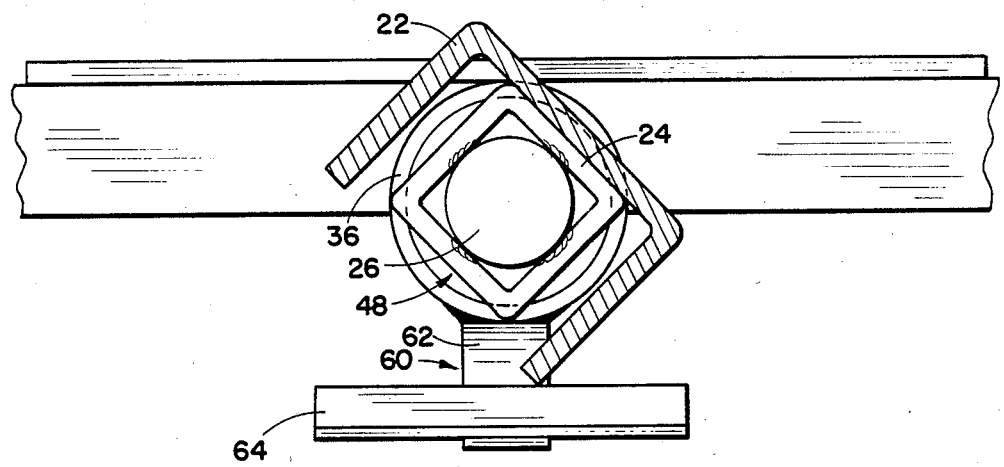
FIG. 6 is a view similar to FIG. 5, showing the operation of a swivel connection embodying the invention when the plane of the motorcycle is veered from the vertical.

A stabilizer or aligning means generally indicated at 60 may be provided between the sleeve 36 and bar 22, and as shown herein comprises an elongated strap means 62 preferably constructed from a suitable yieldable metallic material, such as spring steel, but not limited thereto and a cross strap 64 either integral therewith or rigidly secured thereto in any suitable or well known manner. One end of the strap 62 may be welded or otherwise secured to the outer periphery of the sleeve 36, preferably at the bottom thereof as particularly shown in FIG. 4, and the opposite end of the strap 62 entends axially outwardly in a direction toward the bar 22. The strap 62 is preferably substantially centrally disposed with respect to the open side of the U-channel 22, and the cross strap 64 is in a normally engaged position with the lower ends of the side walls of the U-channel, as will be seen in FIG. 5. In the event the motorcycle 10 veers sufficiently from an upright or vertical position, the bar 22 will be rotated about the central axis of the spindle 26 whereby one of the legs of the U-channel 22 will engage the cross strap 64 and deflect the strap 62, as shown in FIG. 6.

In use, the hitch member 14, having the swivel connection device secured thereto, may be secured to the ball means 12 of the motorcycle 10 in the usual manner for securing the trailer 20 to the motorcycle for towing thereby. As the motorcycle 10 travels along a highway, or the like, any deviation of the motorcycle from the vertical orientation thereof will be isolated from the trailer by the pivotal action of the spindle 26 with respect to the sleeve 36. The stabilizer means 60 functions to facilitate the maintenance of the upright vertical position of the motorcycle 10 since the normal position of the trailer is an upright vertical orientation. In the event the motorcycle is severely removed from the vertical orientation, as for example when the motorcycle leans or tilts to an angle of approximately 45° from the vertical, the stabilizer means 60 will be deflected for assuring that the tilting of the cycle will not be transmitted to the trailer. Thus, the motorcycle may be "lost" completely, or in other words may turn over, but the trailer 20 and contents will remain intact.

From the foregoing it will be apparent that the present invention provides a novel swivel connection between a motorcycle, or other small vehicle, and a towed trailer whereby the variations of the motorcycle from a true or substantially vertical orientation will be isolated from the trailer being towed by the cycle. The swivel connection means includes a spindle means secured to the usual hitch assembly of the motorcycle and journalled within a sleeve means secured to the trailer, thus providing a rotational connection about a substantially horizontially disposed axis to provide the isolating action at the swivel connection.

Whereas the present invention has been described in particular relation to the drawings attached hereto, it should be understood that other and further modifications, apart from those shown or suggested herein may be made within the spirit and scope of this invention.

What is claimed is:

1. Apparatus for connecting a vehicle hitch assembly to a trailer comprising:

an elongated bar member extending generally horizontally from the vehicle hitch assembly, the bar member being of inverted U-shaped cross-sectional configuration;

a spindle member secured at one end to and in alignment with said bar member and within the U-shaped cross-sectional configuration thereof, the other end portion of the spindle member extending beyond said bar member in the direction away from the vehicle hitch assembly;

a bearing assembly formed in a housing and bearings therein received on the other end of said spindle member, the bearing assembly housing being secured to the trailer, the trailer being thereby rotatable relative to said spindle member;

an elongated deflectable strap of spring steel affixed at one end to and extending in a horizontal plane of said bearing assembly housing and extending parallel to and below said bar member; and a cross strap affixed to the other end of said deflectable strap and in engagement with said bar member, the cross strap being downwardly deflected as said bearing assembly housing is rotated relative to said bar member, resiliently deflecting said deflatable strap, said deflectable strap tending to maintain said bar member and said bearing assembly housing, and thereby the vehicle and trailer, in stabilized relative rotational orientation while nevertheless permitting rotational disorientation.

2. A swivel connection device adapted to be secured between a hitch assembly of a small vehicle and a trailer, the device comprising:

a box member secured to the hitch assembly and extending in a direction away from the small vehicle;

a spindle means rigidly secured to the box member and extending axially outwardly therefrom in a direction away from the hitch assembly;

a journal means secured to the trailer for receiving the spindle means therein for free rotation about its own longitudinal axis whereby variations in rotational orientation of the small vehicle are isolated from the trailer;

means resiliently extending between said journal means and said box member tending to stabilize the relative rotational orientation of said journal means and said box member while nevertheless permitting rotational disorientation; and wherein said journal means comprises sleeve means rigidly secured to the trailer in substantial axial alignment with the spindle means for receiving the spindle means therein, shoulder means provided on the spindle means for limiting movement of the spindle means in one direction with respect to the sleeve means, locking means cooperating between the spindle means and sleeve means for securing the spindle means against longitudinal movement with respect to the sleeve means, bearing means interposed between the sleeve means and spindle means for facilitatipg free rotation of the spindle means within the sleeve means, and seal means interposed between the sleeve means and spindle means for reduction of contamination.

* * * * *